United States Patent
Hamada et al.

(10) Patent No.: US 6,738,218 B1
(45) Date of Patent: May 18, 2004

(54) DISK STORAGE DEVICE AND HEAD POSITIONING METHOD

(75) Inventors: Yosuke Hamada, Odawara (JP); Iwao Oshimi, Naka-gun (JP); Jiro Abe, Sagamihara (JP); Kiyotada Ito, Odawara (JP); Shinsuke Nakagawa, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 389 days.

(21) Appl. No.: 09/655,825

(22) Filed: Sep. 6, 2000

(30) Foreign Application Priority Data

Oct. 27, 1999 (JP) .......................... 11-304964

(51) Int. Cl.⁷ .......................... G11B 5/596; G11B 15/52
(52) U.S. Cl. .......................... 360/77.02; 360/69; 360/75; 360/77.01
(58) Field of Search .......................... 360/77.02, 78.04, 360/78.07, 69, 75, 77.01; 318/561

(56) References Cited

U.S. PATENT DOCUMENTS

| | | | | |
|---|---|---|---|---|
| 4,398,228 A | * | 8/1983 | Bauck .................... | 360/77.02 |
| 4,954,905 A | * | 9/1990 | Wakabashi et al. ...... | 360/77.03 |
| 5,126,897 A | * | 6/1992 | Ogawa et al. ........... | 360/78.09 |
| 5,164,931 A | * | 11/1992 | Yamaguchi et al. ..... | 369/44.29 |
| 5,182,685 A | * | 1/1993 | Krause et al. ........... | 360/78.13 |
| 5,301,101 A | * | 4/1994 | MacArthur et al. ..... | 700/36 |
| 5,307,330 A | * | 4/1994 | Okamura ................. | 360/78.09 |
| 5,402,400 A | * | 3/1995 | Hamada et al. .......... | 360/78.06 |
| 5,561,568 A | * | 10/1996 | Kisaka .................... | 360/78.04 |
| 5,835,299 A | * | 11/1998 | Lee et al. ................ | 360/76 |
| 6,204,622 B1 | * | 3/2001 | Tsuruta ................... | 318/609 |

FOREIGN PATENT DOCUMENTS

| | | |
|---|---|---|
| JP | 07-057414 | 3/1995 |
| JP | 11-120722 | 4/1999 |
| JP | 11-195278 | 7/1999 |

* cited by examiner

*Primary Examiner*—David Hudspeth
*Assistant Examiner*—Jason Olson
(74) *Attorney, Agent, or Firm*—Antonelli, Terry, Stout & Kraus, LLP

(57) ABSTRACT

Settling response characteristics after change-over from a speed controller to a position controller is attained. Fluctuations in a time taken until change-over is made from the speed controller to the position controller are reduced to stabilize a moving time and to shorten an access time. To this end, a position controller generates a drive signal of a linear or primary function of time in such a manner that a position deviation signal responds to it with a ternary-order function of time which becomes zero in a desired finite settling time. Further, a feedforward signal generator is provided to reduce a follow-up error to a target position signal as an output of a target position signal generator. Furthermore, a switching judger is provided to start its judging operation after the position deviation signal reaches a predetermine position deviation and to perform switching operation from the speed controller to the position controller when the position deviation signal is not larger than a value corresponding to a proportional multiple of a speed signal.

7 Claims, 4 Drawing Sheets

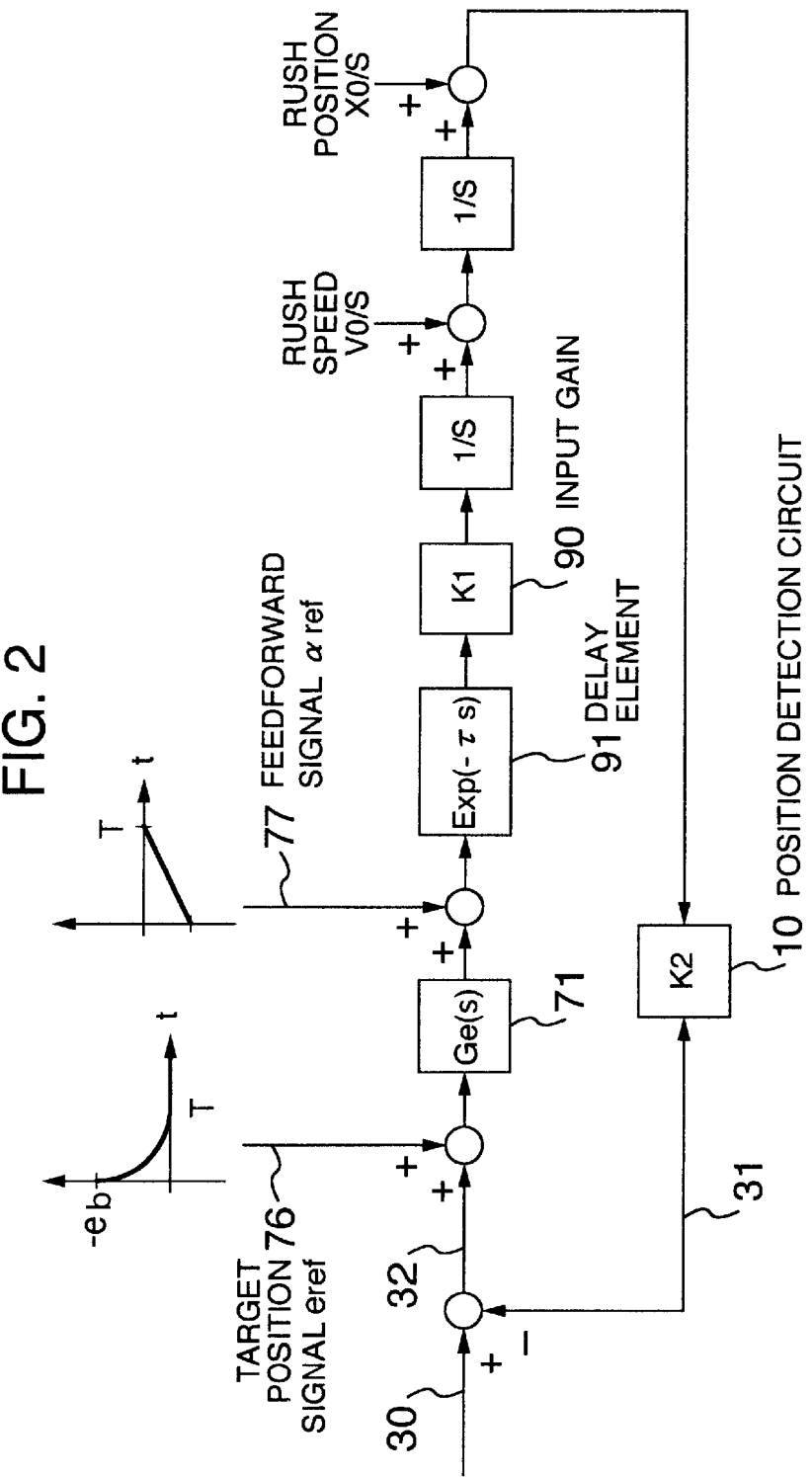

FIG. 3 - BACKGROUND ART
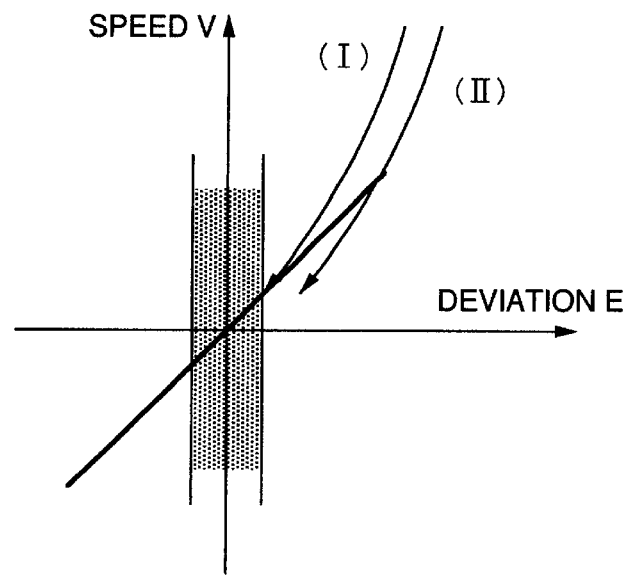
FIG. 4
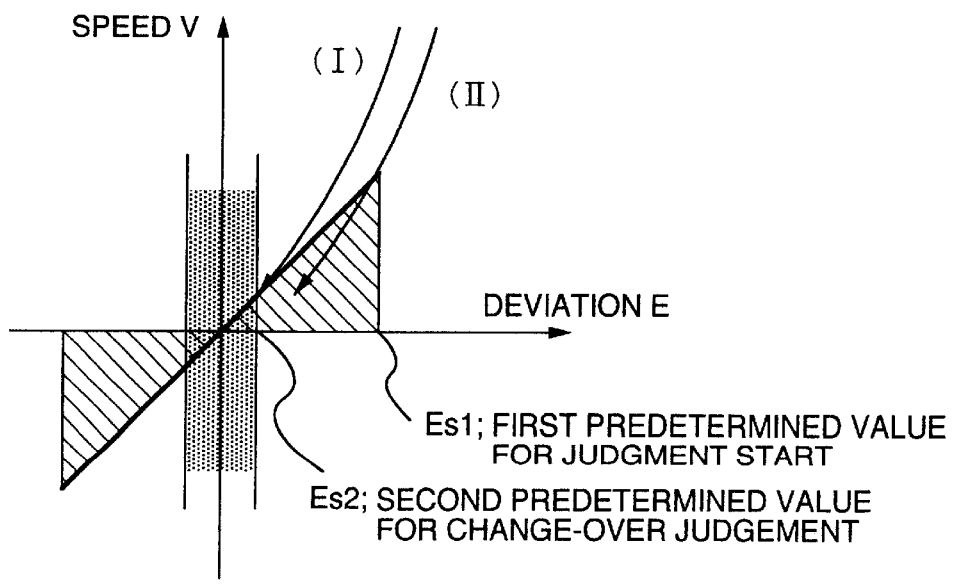

DISK STORAGE DEVICE AND HEAD POSITIONING METHOD

BACKGROUND OF THE INVENTION

The present invention relates to devices for controlling positioning of an information recording and reproducing device and more particularly, to a device for controlling positioning of a magnetic disk device, an optical disk device or the like.

In an information recording and reproducing device such as a magnetic disk device or an optical disk device, its challenge is to realize a shortened access time by quickly positioning a head position to a target track position.

The access time in the disk device is determined by a time required for a speed control system to perform speed control for movement to the vicinity of the target track and by a time after change-over from-a speed control mode to a positioning control mode until the head is set at the target track position. The position control system immediately after the change-over from the speed control system to a position control system is controlled usually by a feedback compensator such as a PID compensator or a lead-lag compensator.

In a position control system disclosed in JP-A-3-23571, for the purpose of improving response characteristics by reducing an overshoot at a position after change-over from a speed control mode to a position follow-up control mode, a target position signal which exponentially approaches gradually a target track position, is added to a position deviation signal to follow up the position deviation signal to the exponentially-attenuating target position signal, thus improving response characteristics.

And the change-over from the speed control system to the position control system is carried out at a time point that a position deviation becomes a constant value or less.

SUMMARY OF THE INVENTION

The background art mentioned above has had a problem that, since the target position signal varies exponentially, only a lapse of an infinite time enables the target position signal to become zero, which results in that there is no guarantee that settling is completed in a finite settling time.

The background art has had another problem that, even when feedback compensation is tried to cause the position signal to follow up a change in the target position signal, a follow-up lag causes a follow-up error, with the result that the settling time cannot be made small.

In such a system that change-over is carried out from a speed control system to a position control system at a time point that a position deviation is a constant value or less, there is further a problem that the change-over is possible in the vicinity of a desired position deviation, but a strong decelerating action in the speed control system causes a head speed to be decelerated too much down to a stall state, thus resulting in an increase of a time taken for the head to reach the target track position, with a prolonged access time.

In accordance with an aspect of the present invention, there is provided a means for causing a position controller to generate a drive signal of a linear or primary function of time when the a position deviation signal becomes zero at a desired finite settling time in such a manner that, immediately after a switching judger changes over from a speed controller to the position controller as a positioning compensator, the position deviation signal responds to it in the form of a ternary-order function of time when the position deviation signal becomes zero at the desired finite settling time; or there is provided a means for causing the position controller to generate a drive signal of an (m+1)-order function of time when the position deviation signal becomes zero at a desired finite settling time in such a manner that the position deviation signal responds to it in the form of an (m+3)-order function (where, m being a natural number) when the position deviation signal becomes zero at a desired finite settling time, whereby the infinite settling time can be made zero.

In the aspect of the present invention, there is provided a recording and reproducing device which includes a target position signal generator for calculating and outputting a target position signal of a ternary-order function of time when a position deviation signal becomes zero in a desired settling time with an inverted value of the position deviation signal as an initial value immediately after change-over to a position controller; a feedforward signal generator for calculating and outputting a feedforward signal of a linear function of time when the position deviation signal becomes zero in the desired settling time with a proportional value of the position deviation signal immediately after change-over to a positioning controller as an initial value; a first adder for adding a target position signal to the position deviation signal and outputting it as a new position deviation signal; a second adder for adding the feedforward signal to a drive signal as an output of a positioning compensator and outputting it as a new drive signal; and an initial value setter for causing state variables of the positioning compensator to be cleared to zeros before the positioning compensator receives the position deviation signal. In this case, since a means is provided for causing feedforward compensation to improve a follow-up performance to the target position signal, a follow-up error to the target position signal can be reduced and a settling time can be shortened.

The target position signal of the ternary-order function and the feedforward signal of the linear function may be replaced by higher-order functions which follow. When the higher-order functions are employed, there is provided a means for calculating and outputting a target position signal of an (m+3)-order function (where, m being a natural number) of time when the position deviation signal becomes zero in the settling time with an inverted value of the position deviation signal immediately after change-over to the position controller as an initial value, and for calculating and outputting a feedforward signal of an (m+1)-order function of time when the feedforward signal becomes zero in a settling time with a proportional value of the position deviation signal immediately after change-over to the positioning controller as an initial value.

Further, a switching judger in the present invention starts its judging operation after the position deviation signal reaches its predetermined position deviation level, performs its switching operation from the speed controller to the position controller when the position deviation signal becomes a value corresponding to a proportional multiple of that of a speed signal, whereby a speed control system prevents an increase of the settling time caused by stall of a head speed and thus variations in a time taken for change-over from the speed controller to the position controller can be stabilized. As a result, a change-over time from the speed controller to the position controller can be stabilized.

BRIEF DESCRIPTION OF THE DRAWINGS

FIG. 2 is a block diagram of an arrangement of a control system when a position controller in the present invention is operating;

FIG. 3 is a phase plane diagram showing change-over conditions in the background art;

FIG. 4 is a phase plane diagram showing change-over conditions in the present invention.

DESCRIPTION OF THE EMBODIMENTS

Explanation will be made as to an embodiment of the present invention with reference to accompanying drawings.

Figure 1:
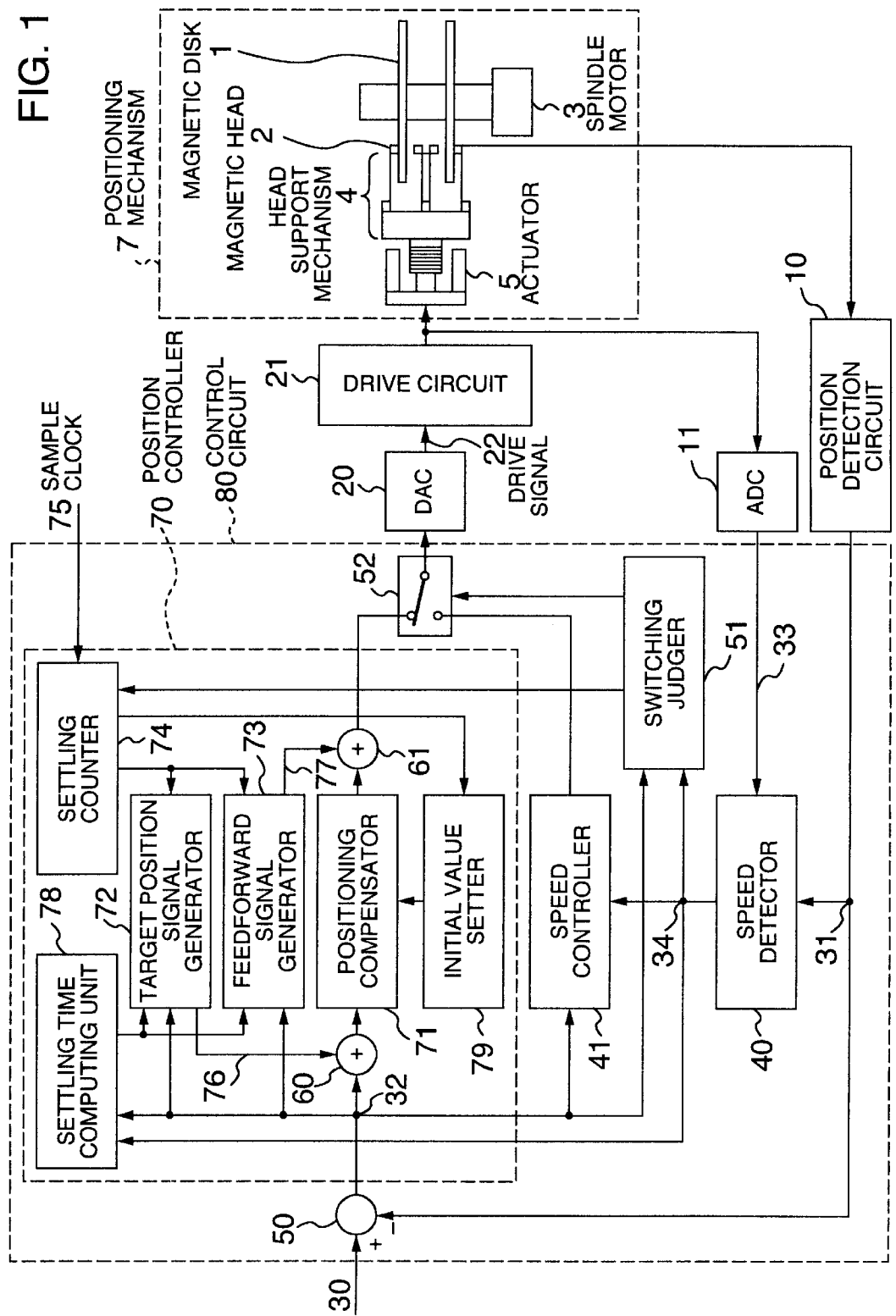
FIG. 1 is a block diagram of an embodiment of the present invention when applied to a magnetic disk device.

FIG. 1 is a block diagram of a magnetic disk device in accordance with an embodiment of the present invention. In the drawing, a magnetic disk 1 is a medium for storing information therein. A magnetic head 2 writes data in a track present on the magnetic disk 1 and reads the data from the track. A spindle motor 3 drivingly rotates the magnetic disk 1. A head support mechanism 4 supports the head 2. An actuator 5 drives the head support mechanism 4. In general, the actuator 5 includes a voice coil motor (which will be referred to merely as the VCM, hereinafter). The aforementioned constituent parts form a positioning mechanism 7. The positioning mechanism 7 plays a role of moving and positioning the head 2 to a target track on the magnetic disk 1.

A position detection circuit 10 outputs, as a head position signal 31, servo data (not shown) indicative of a disk radial-directional position which is previously recorded on the magnetic disk 1 and which is read out by the magnetic head 2. A subtracter 50 subtracts the head position signal 31 from a target track position signal 30 to calculate a position deviation signal 32 necessary for positioning, and outputs the position deviation signal.

A speed detector 40 calculates a speed signal 34 indicative of the speed of the magnetic head 2. The speed signal 34 can also be obtained by adding a signal which corresponds to a differentiation of the head position signal 31 or which is obtained by passing a differentiated result of the head position signal 31 through a low-pass filter to pass its low frequency components alone therethrough, to a signal which is obtained by passing an integrated result of a VCM current signal 33 through a high-pass filter to pass its high frequency components alone.

When the speed detector 40 integrates the VCM current signal 33 to calculate a speed term, an A/D converter (ADC) 11 samples the VCM current signal 33 as a signal proportional to an acceleration and sends it to the speed detector 40. The speed detector 40 integrates the VCM current signal to calculate a speed signal.

A speed controller 41 operates when a residual track amount until the target track is great. The controller 41 usually previously stores a predetermined target speed profile and performs its control operation to cause the speed signal 34 to follow up the target speed profile. A position controller 70 receives an input from the position deviation signal 32 and controls the position deviation signal 32 to be zero.

A switching judger 51, on the basis of the position deviation signal 32 and the speed signal 34, selects either an output signal of the speed controller 41 or an output signal of the position controller 70 to perform switching operation over a switch 52.

The signal selected by the switch 52 is converted by a D/A converter (DAC) 20 from a digital signal to an analog signal and then output to a drive circuit 21 as a drive signal 22. The drive circuit 21 supplies a current corresponding to the drive signal 22 to the actuator 5. The actuator 5 generates a thrust proportional to the current to move and position the head support mechanism 4 having the magnetic head 2 mounted thereon.

The operations of the speed detector 40, speed controller 41, subtracter 50, position controller 70 and switching judger 51 are all carried out in a control circuit 80. The control circuit 80 is implemented with use of an analog operating circuit or a digital operating circuit such as a microcomputer. Since predominant one of disk storage devices in these years is implemented with use of the microcomputer, the control circuit 80 in FIG. 1 is illustrated to be implemented with use of a microcomputer.

The operation of the position controller 70 in the present invention will be explained more in detail by referring to FIG. 2. The drawing is a block diagram of a control system when the position controller 70 is operating. For easy understanding, the structure of the position controller 70 is represented in FIG. 2 in the form of an equivalently converted one from a discrete time system (digital operating circuit) to a continuous time system (analog operating circuit).

In the drawing, s denotes Laplacean and 1/s denotes an integrator. A gain (K1) 90 denotes a gain from the drive signal as an output of the control circuit to a head acceleration, and the gain is obtained by multiplying the gain of the D/A converter (DAC) 20, the gain of the drive circuit 21, a gain of a reciprocal of the inertia of the actuator (VCM) 5 together. Exp(−s) denotes a delay element corresponding to a sum of the operating time delay of the control circuit when implemented with a digital operating circuit (microcomputer), the delay of the D/A converter 20 when zero-order holding data at intervals of a constant time, etc. X0, V0 and e0 denote the rush position, rush speed and initial position deviation signal of the head 2 immediately after change-over from the speed controller 41 to the position controller 70 respectively.

Using the initial position deviation signal e0, a target position signal generator 72 calculates a target position signal 76 expressed by a ternary-order function which follows.

$$e_{ref}(t) = \left\{ \begin{array}{ll} -\left(1 - \frac{t}{T}\right)^3 e_0 & (0 \leq t \leq T) \\ 0 & (T \leq t) \end{array} \right\} \quad \text{(Equation 1)}$$

t in Equation (1) is a time variable which is set to be zero when change-over is carried out from the speed controller 41 to the position controller 70, and T denotes a settling time. In order to follow up the head position to the target position signal 76, an acceleration corresponding to the target position signal 76 must be generated in the head. To this end, a feedforward signal generator 73 calculates a feedforward signal 77 and generates it as a part of the drive signal. Since there are the delay element exp(−s) and an input gain K1 in a loop from the feedforward signal 77 to the head acceleration, the feedforward signal is found by multiplying a gain 1/{K1·exp(−s)} by a desired acceleration signal to be generated.

Multiplying by the delay element exp(−s) means to generate the desired acceleration signal with its time lead of τ (in seconds). Since the desired acceleration signal is obtained by dividing a signal corresponding to a second-order differentiation of Equation (1) by a detection gain K2, the feedforward signal 77 is expressed as follows.

$$\alpha_{ref}(t) = \begin{cases} \frac{-6e_0}{K_1 K_2 T^2}\left(1 - \frac{t+\tau}{T}\right) & (0 \le t \le (T-\tau)) \\ 0 & ((T-\tau) \le t) \end{cases} \quad \text{(Equation 2)}$$

The target position signal of Equation (1) and the feedforward signal of Equation (2) are calculated by the digital operating circuit such as a microcomputer. When the feedforward signal 77 can produce a head position response corresponding to the target position signal, the position deviation signal received in a positioning compensator 71 is zero. The then role of the positioning compensator 71 is to set to zero the position deviation signal generated because of not being corrected by the feedforward signal 77.

Explanation will next be made as to the detailed operation of the position controller 70 implemented with the digital operating circuit such as a microcomputer. The control circuit 80 samples the head position signal 31 at intervals of a constant time $T_s$ (in seconds), performs the calculations of the position deviation signal 32, positioning compensator 71, target position signal generator 72, feedforward signal generator, first and second adders 60 and 61 to obtain the drive signal 22, and then outputs it to the D/A converter 20. The positioning compensator 71 is of a feedback type such as a PID (Proportional-Integral-Derivative) compensator or a lead-lag compensator, and operates to cause the position deviation signal 32 to follow up the target position signal 76.

For the purpose of preventing the initial values of the inner state variables of the positioning compensator 71 from affecting the settling response immediately after change-over from the speed controller 41 to the position controller 70, an initial value setter 79 clears, prior to reception of the position deviation signal 32, the state variables of the positioning compensator 71 to zeros. This results in that the positioning compensator 71 can produce a zero output at first, and, after the change-over to the position controller 70, the positioning compensator 71 can perform its controlling operation only with the feedforward signal 77.

More detailed explanation will then be made as to how to generate the target position signal 76 and feedforward signal 77 in the digital operating circuit such as the microcomputer.

A settling counter 74 is cleared to zero when the switching judger 51 caused change-over from the speed controller 41 to the position controller 70, and is incremented each time the settling counter receives a sample clock 75 having a sampling period of $T_s$ (in seconds). Assuming that the settling counter 74 has a value of k, then a relationship between the time t (in seconds) and sampling period $T_s$ is written as.

$$t = kT_s (k=0,1,2,\ldots) \quad \text{(Equation 3)}$$

A settling time counter value N indicative of the settling time T (in seconds) is written as.

$$T = NT_s \quad \text{(Equation 4)}$$

Hence the target position signal generator 72 and feedforward signal generator 73 calculate the target position signal of Equation (5) and the feedforward signal of Equation (6) with use of the settling counter value k and the setting time counter value N respectively in the digital operating circuit (microcomputer).

$$e_{ref}(k) = \begin{cases} -\left(1 - \frac{k}{N}\right)^3 e_0 & (k = 0, 1, 2, \ldots, N) \\ 0 & (N \le k) \end{cases} \quad \text{(Equation 5)}$$

$$\alpha_{ref}(k) = \begin{cases} \frac{G_{FF}}{N^2}\left(1 - \frac{k+n}{N}\right)e_0 & (k = 0, 1, 2, \ldots, N-n) \\ 0 & (N-n \le k) \end{cases} \quad \text{(Equation 6)}$$

where, $G_{FF}$ and n in Equation (6) are respectively expressed by Equations (7) and (8) which follow.

$$G_{FF} = \frac{-6}{K_1 K_2 T_S^2} \quad \text{(Equation 7)}$$

$$n = \frac{\tau}{T_S} \quad \text{(Equation 8)}$$

In order that the head position follows up the target position signal expressed by the ternary-order function, it is necessary to secure a continuity which is expressed by Equation (9) between a signal corresponding to a differentiation of the target position signal $e_{ref}$ and a rush speed signal V0.

$$\left.\frac{de_{ref}(t)}{dtK_2}\right|_{t=0} = \frac{3e_0}{TK_2} = \frac{3E0}{T} = V0 \quad \text{(Equation 9)}$$

where, E0 is a positional deviation upon rush time, which is expressed by a difference (in meters) between the target track position and head position. Thus in order to attain a good settling response, it is necessary to calculate and output the target position signal and feedforward signal with use of the settling time T (in seconds) which is written by the following Equation (10).

$$T = \frac{3E0}{V0} \quad \text{(Equation 10)}$$

A settling time computing unit 78 calculates the setting time counter value N in accordance with Equation (11) (given below), and outputs it to the target position signal generator 72 and feedforward signal generator 73. In Equation (10), V0 denotes a value of the speed signal 34 when the time t is 0, that is, a rush speed signal, and $K_v$ denotes the speed detection gain of the speed detector 40.

Explanation will next be made as to the operation of the switching judger 51. In the background art, change-over from the speed controller 41 to the position controller 70 has been carried out when the absolute value of a position deviation becomes a predetermined value or less on the phase plane defined by positional deviation E and speed V as shown in FIG. 3. In this background art method, good change-over can be realized when switching is made from the speed controller 41 to the position controller as shown by (I) in FIG. 3. However, when deceleration becomes too strong by the speed controller as shown by (II) in FIG. 3, the speed stalls (the speed is reduced too much) so that it disadvantageously takes lots of time until the positional deviation becomes zero.

To avoid this, the switching judger 51 in the present invention causes change-over from the speed controller 41 to the position controller 70 under first conditions that the positional deviation and speed falls in a hatched area in FIG.

4, that is, both when the absolute value of the positional deviation is not larger than a first predetermined value Es1 for judgement start and when the position deviation signal is not larger than a proportionally multiplied value of that of the speed signal. Even under a condition (second judgement condition) that the absolute value of the positional deviation is not larger than a second predetermined value Es2 for the change-over, the change-over from the speed controller 41 to the position controller 70 is carried out to cope with the case of an acceleration trend as opposed to the stall trend. As a result, even when the deceleration becomes too strong in the speed controller 41, it is possible to realize a good change-over to the position controller.

After the change-over to the position controller 70, the settling time T is determined by the settling time computing unit 78 in accordance with Equation (10), and an actual settling time counter within the microcomputer is determined by Equation (11) which follows.

$$N = \frac{3 \cdot E0}{T_S \cdot V0} = \frac{3 \cdot e_0/K_2}{T_S \cdot v_0/K_v} \quad \text{(Equation 11)}$$

Figure 5:
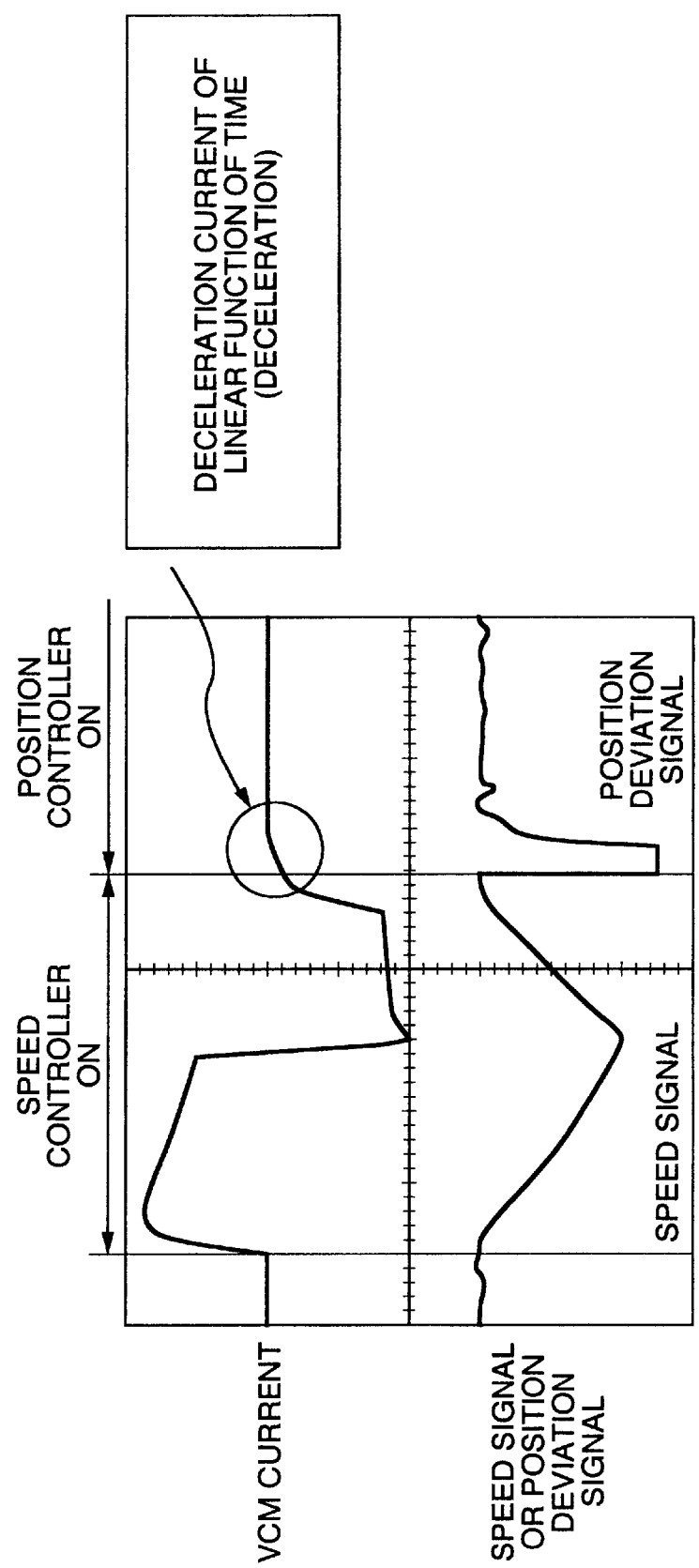
FIG. 5 is a diagram showing response waveforms of a VCM current, head speed signal and position deviation signal.

When a desired finite settling time is denoted by $T_{SPEC}$, the slope (V/E) of a straight line indicative of a change-over boundary of the phase plane in FIG. 5 is specified to be $3/T_{SPEC}$ in Equation (10), the settling time can be specified to be nearly $T_{SPEC}$ (in seconds). Further, a higher-order target position signal, feedforward signal and settling time can be obtained by calculating Equations (12) to (19) which follow, where m is a natural number.

$$e_{ref}(t) = \begin{cases} -\left(1 - \frac{t}{T}\right)^{m+3} e_0 & (0 \le t \le T) \\ 0 & (T \le t) \end{cases} \quad \text{(Equation 12)}$$

$$\alpha_{ref}(t) = \quad \text{(Equation 13)}$$
$$\begin{cases} \frac{-(m+3)(m+2)e_0}{K_1 K_2 T^2}\left(1 - \frac{t+\tau}{T}\right)^{m+1} & (0 \le t \le (T-\tau)) \\ 0 & ((T-\tau) \le t) \end{cases}$$

$$e_{ref}(k) = \begin{cases} -\left(1 - \frac{k}{N}\right)^{m+3} e_0 & (k = 0, 1, 2, \ldots, N) \\ 0 & (N \le k) \end{cases} \quad \text{(Equation 14)}$$

$$\alpha_{ref}(k) = \quad \text{(Equation 15)}$$
$$\begin{cases} \frac{G_{FF}}{N^2}\left(1 - \frac{k+n}{N}\right)^{m+1} e_0 & (k = 0, 1, 2, \ldots, N-n) \\ 0 & (N-n \le k) \end{cases}$$

$$G_{FF} = \frac{-(m+3)(m+2)}{K_1 K_2 T_S^2} \quad \text{(Equation 16)}$$

$$\left.\frac{de_{ref}(t)}{dt K_2}\right|_{t=0} = \frac{(m+3)e_0}{TK_2} = \frac{(m+3)E0}{T} = V0 \quad \text{(Equation 17)}$$

$$T = \frac{(m+3)E0}{V0} \quad \text{(Equation 18)}$$

$$N = \frac{(m+3) \cdot E0}{T_S \cdot V0} = \frac{(m+3) \cdot e_0/K_2}{T_S \cdot v_0/K_V} \quad \text{(Equation 19)}$$

After the change-over to the position controller 70, the settling time T is determined by the settling time computing unit 78 in accordance with Equation (18), and an actual settling time counter within the microcomputer is determined in accordance with Equation (19). When a desired finite settling time is denoted by $T_{SPEC}$, the slope (V/E) of the straight line indicative of the change-over boundary of the phase plane in FIG. 5 is specified to be $(m+3)/T_{SPEC}$ in Equation (18), the settling time can be specified to be nearly $T_{SPEC}$ (in seconds).

FIG. 5 shows results when the present invention having the target position signal generator 72, feedforward signal generator 73 and switching judger 51 having such features as mentioned in the foregoing is applied to a head positioning control system of a magnetic disk device. FIG. 5 shows the results when control after change-over from the 41 to the position controller 70 is made so that the position deviation signal responds to it in the form of a ternary-order function with the drive signal of the linear function of time, and shows the current waveform of the actuator (VCM) 5, the speed signal 34 and position deviation signal 32 when the actuator is moved by about ⅓ of a movable full stroke and positioned. In FIG. 5, the waveform illustrated in its lower part shows the speed signal 34 when the speed controller is operating and shows the position deviation signal 32 when the position controller 70 is operating. The position deviation signal 32 is illustrated as saturated for its constant value or higher.

It will be confirmed from the results of FIG. 5 that, when the current signal reaches zero with a linear function of time after change-over from the speed controller 41 to the position controller 70, the position deviation signal 32 reaches zero and good settling characteristics can be obtained. Although FIG. 5 shows the results showing the effects when the drive signal is expressed in the form of a linear function, a good response can be similarly realized even when the drive signal is expressed in the form of second- or higher-order function.

As has been explained in the foregoing, in accordance with the present invention, settling response characteristics after the change-over from the speed controller to the position controller can be improved can be stabilized in a desired settling response time, and an access time taken from data writing to data reading can be shortened.

What is claimed is:
1. A recording and reproducing device comprising:
   a storage medium for recording data therein;
   a head for recording and reproducing data in and from the storage medium;
   a position detection circuit for detecting a position of the head;
   a subtracter for calculating a position deviation signal on the basis of an output of the position detection circuit and a target position signal;
   a speed detector for calculating a speed of said head and outputting a speed signal;
   a speed controller for outputting a drive signal to move said bead in response to said speed signal and said position deviation signal;
   a position controller for outputting a drive signal of a linear function to position said head at a target position on a basis of said position deviation signal;
   a switching judger for performing a switching operation from the speed controller to the position controller;
   a target position signal generator for outputting a target position signal of a ternary-order function with an inverted value of said position deviation signal as an initial value after the changeover to the position controller;
   a feedforward signal generator for outputting a feedforward signal of a linear function with a proportional value of the position deviation signal after change-over to a positioning controller as an initial value;

a first adder for adding said target position signal to said position deviation signal and outputting its added result as a new position deviation signal;

a second adder for adding said feedforward signal to a drive signal as an output of a positioning compensator and outputting its added result as a new drive signal; and an initial value setter for causing state variables of the positioning compensator to be cleared to zeros before the positioning compensator receives the position deviation signal.

2. A recording and reproducing device as set forth in claim 1, wherein said switching judger performs its switching operation from the speed controller to the position controller when said position deviation signal is not larger than a proportional multiple of a value of said speed signal.

3. A recording and reproducing device as set forth in claim 1, further comprising a settling time computing unit for calculating a desired settling time on the basis of a ratio between said position deviation signal and said speed signal at the time of the change-over to said position controller.

4. A magnetic disk device comprising:

a magnetic disk for recording data therein;

a head for recording and reproducing data in and from the magnetic disk;

a position detection circuit for detecting a position of the head:

a subtracter for calculating a position deviation signal on the basis of an output of the position detection circuit and a target position signal;

a speed detector for calculating a speed of said head and outputting a speed signal;

a speed controller for outputting a drive signal to move said head in response to said speed signal and said position deviation signal;

a position controller for outputting a drive signal of a linear function to position said head at a target position on a basis of said position deviation signal;

a switching judger for performing a switching operation from the speed controller to the position controller;

a target position signal generator for outputting a target position signal of a ternary-order function with an inverted value of said position deviation signal as an initial value after the change-over to the position controller;

a feedforward signal generator for outputting a feedforward signal of a linear function with a proportional value of the position deviation signal after change-over to a positioning controller as an initial value;

a first adder for adding said target position signal to said position deviation signal and outputting its added result as a new position deviation signal;

a second adder for adding said feedforward signal to a drive signal as an output of a positioning compensator and outputting its added result as a new drive signal; and an initial value setter for causing state variables of the positioning compensator to be cleared to zeros before the positioning compensator receives the position deviation signal.

5. A magnetic disk device as set forth in claim 4, wherein said switching judger performs its switching operation from the speed controller to the position controller when said position deviation signal is not larger than a proportional multiple of a value of said speed signal.

6. A magnetic disk device as set forth in claim 4, further comprising a settling time computing unit for calculating a desired settling time on the basis of a ratio between said position deviation signal and said speed signal at the time of the changeover to said position controller.

7. A head positioning method comprising the steps of:

controlling a speed;

performing a switching operation of a controller from a speed controller to a position controller when said position deviation signal is not larger than a proportional multiple of value of said speed signal; and controlling a position, wherein said speed control step further includes the steps of:

detecting a position of a head for recording and reproducing data in and from a storage medium;

calculating a positional deviation from the positioned position and a target position and outputting said positional deviation as a position deviation signal;

calculating a speed of said head and outputting its calculated speed as a speed signal; and outputting a drive signal to move said head in response to the speed signal and said position deviation signal, and wherein said position control step includes the steps of:

outputting a target position signal of a ternary-order function with an inverted value of said position deviation signal as an initial value;

outputting a feedforward signal of a linear function with a proportional value of said position deviation signal as an initial value;

adding said target position signal to said position deviation signal and outputting its added result as a new position deviation signal;

adding said feedforward signal to a drive signal as an output of a positioning compensator and outputting its added result as a new drive signal; and clearing state variables of the positioning compensator to zeros before the positioning compensator receives said position deviation signal.

* * * * *